Figure 1:
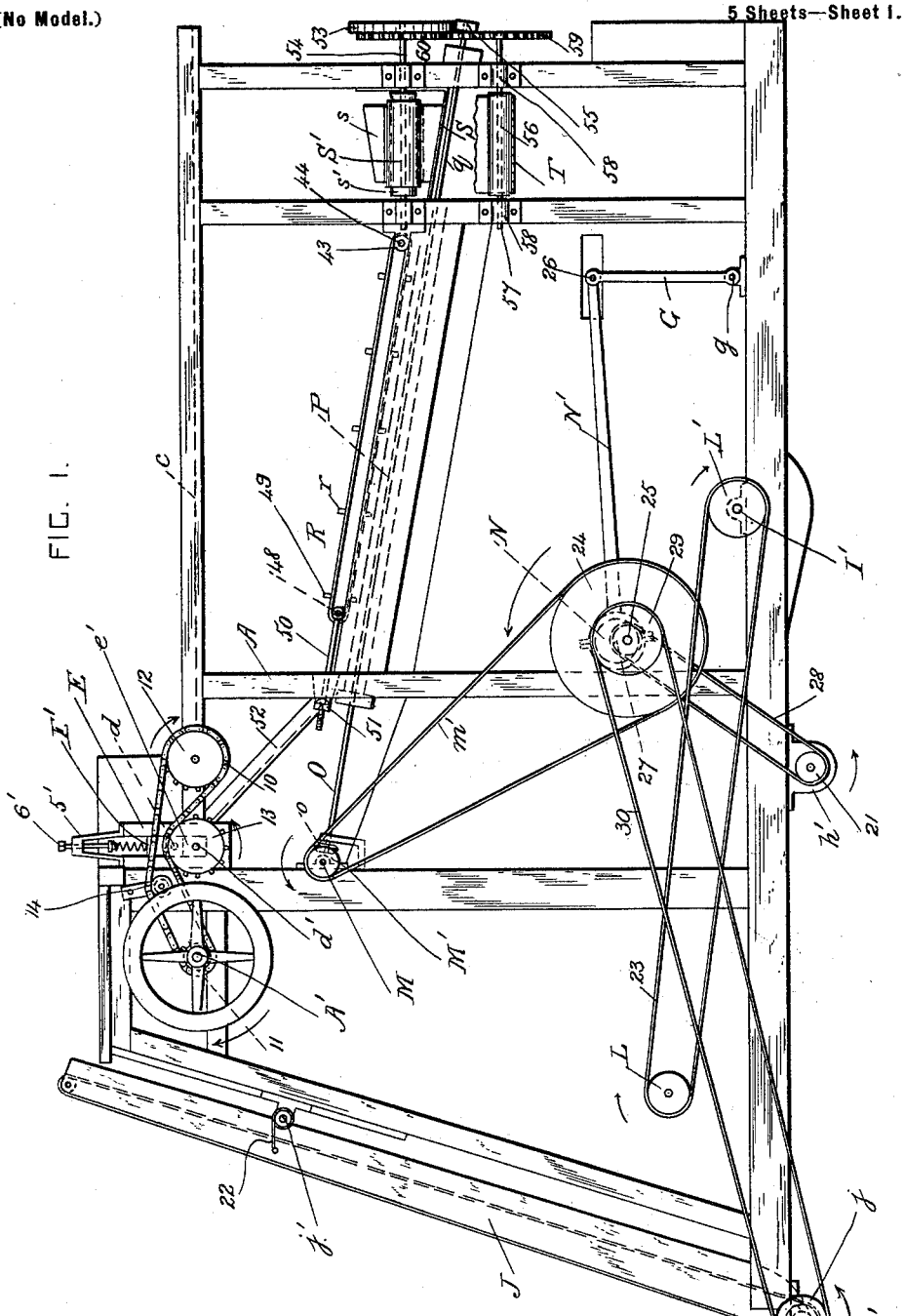

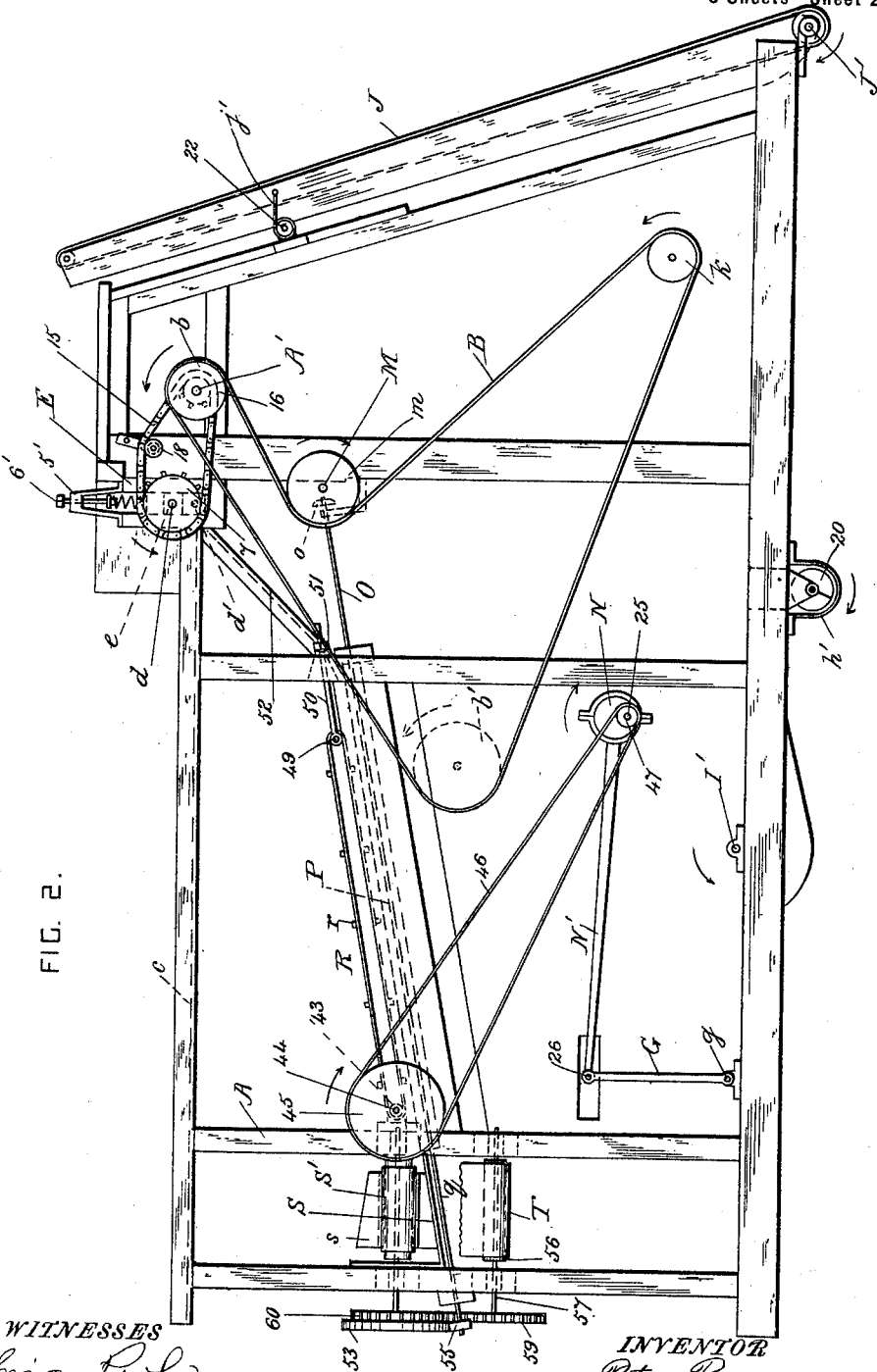

No. 619,231. Patented Feb. 7, 1899.
P. RUPP.
CORN HUSKER AND FEED CUTTER.
(Application filed Jan. 22, 1898.)
(No Model.) 5 Sheets—Sheet 1.

WITNESSES
INVENTOR
Peter Rupp
by Herbert W. T. Jenner.
Attorney

THE NORRIS PETERS CO., PHOTO-LITHO., WASHINGTON, D. C.

No. 619,231. Patented Feb. 7, 1899.
P. RUPP.
CORN HUSKER AND FEED CUTTER.
(Application filed Jan. 22, 1898.)
(No Model.) 5 Sheets—Sheet 3.
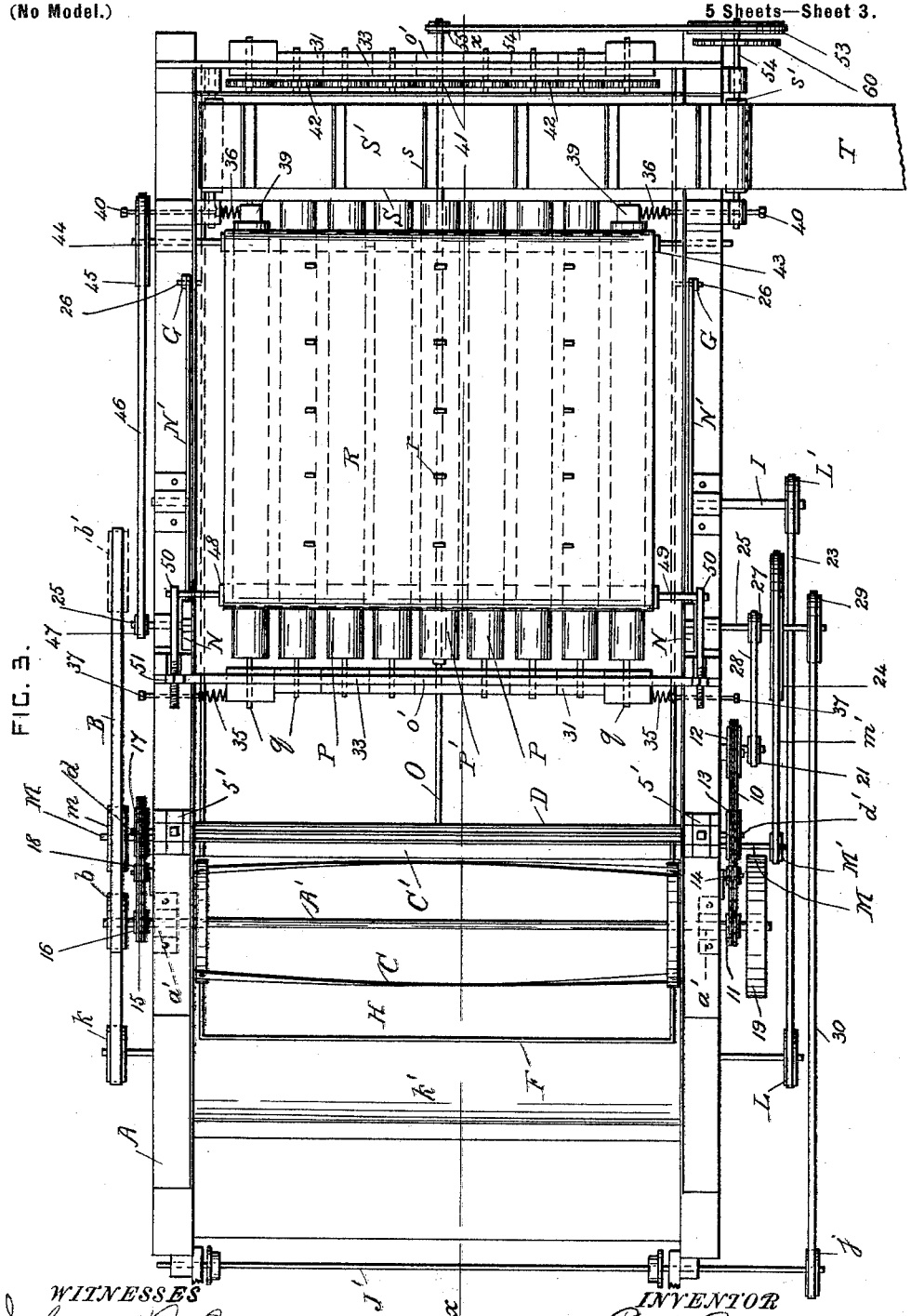
WITNESSES
INVENTOR
Peter Rupp
by Herbert W. Jenner.
Attorney

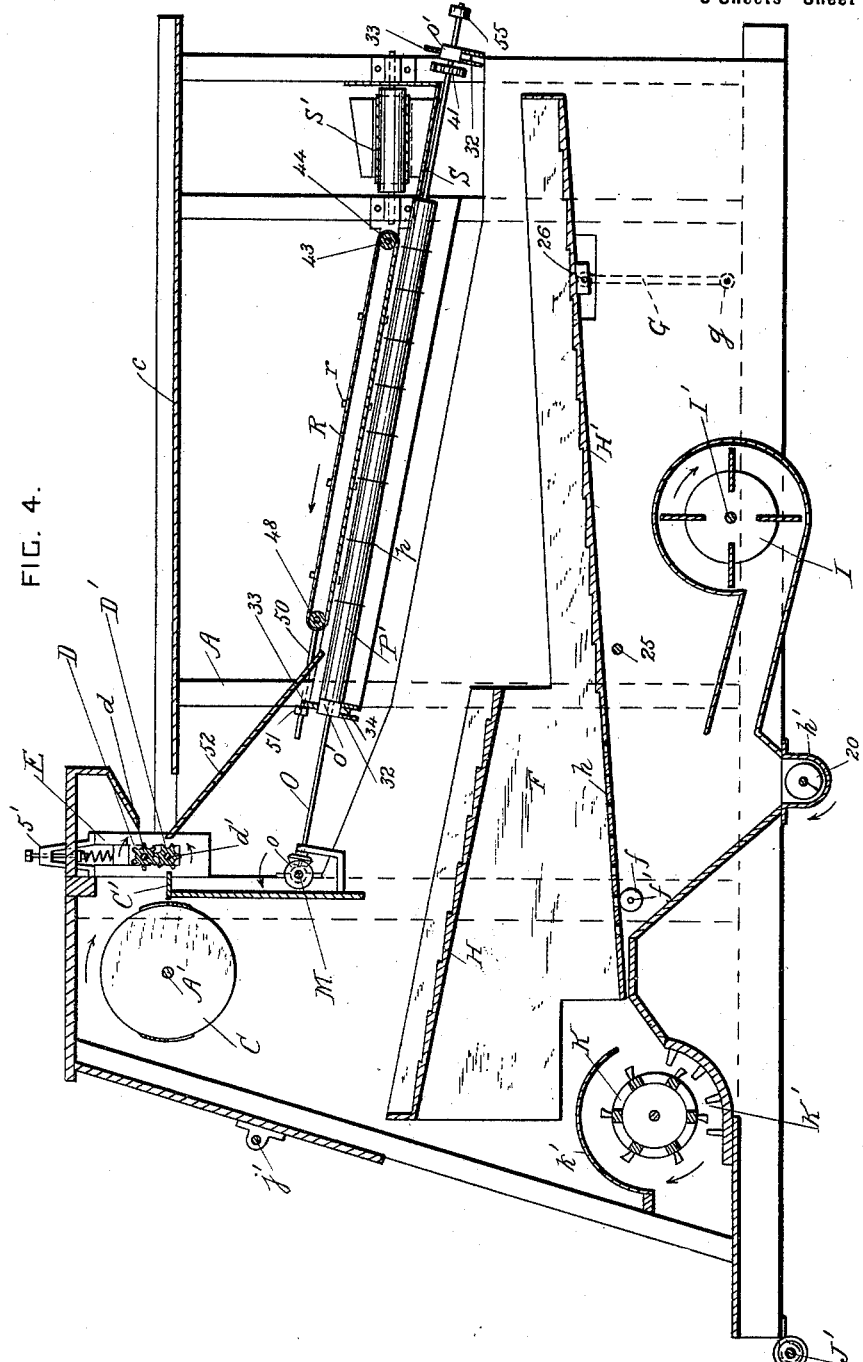

No. 619,231. Patented Feb. 7, 1899.
P. RUPP.
CORN HUSKER AND FEED CUTTER.
(Application filed Jan. 22, 1898.)
(No Model.) 5 Sheets—Sheet 5.
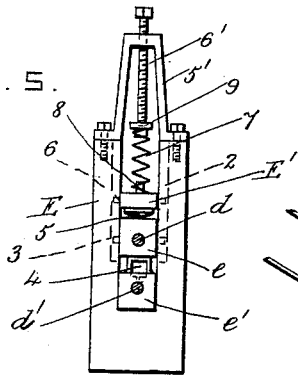
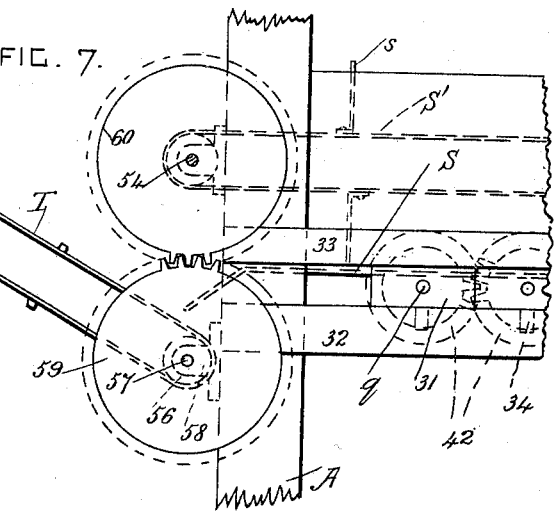
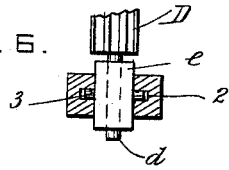
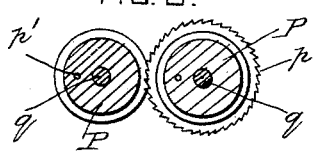
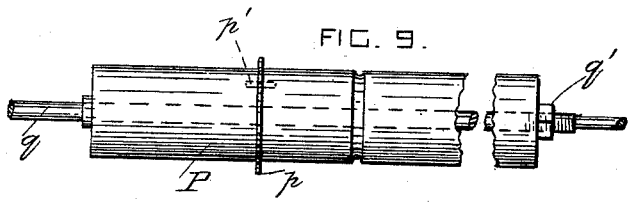
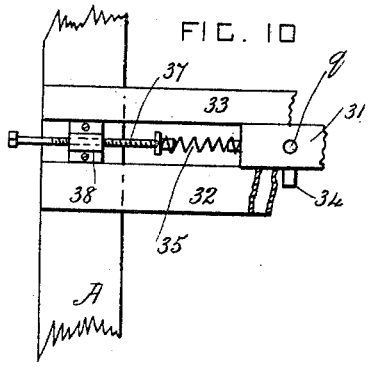
WITNESSES
INVENTOR
Peter Rupp
by Herbert W. T. Jenner.
Attorney

UNITED STATES PATENT OFFICE.

PETER RUPP, OF WHITE HOUSE, OHIO.

CORN-HUSKER AND FEED-CUTTER.

SPECIFICATION forming part of Letters Patent No. 619,231, dated February 7, 1899.

Application filed January 22, 1898. Serial No. 667,594. (No model.)

*To all whom it may concern:*

Be it known that I, PETER RUPP, a citizen of the United States, residing at White House, in the county of Lucas and State of Ohio, have invented certain new and useful Improvements in Corn-Huskers and Feed-Cutters; and I do hereby declare the following to be a full, clear, and exact description of the invention, such as will enable others skilled in the art to which it appertains to make and use the same.

This invention relates to corn-huskers and fodder cutters and shredders; and it consists in the novel construction and combination of the parts hereinafter fully described and claimed.

In the drawings, Figure 1 is a side view of the machine. Fig. 2 is also a side view, but of the opposite side. Fig. 3 is a plan view, parts of the machine being removed. Fig. 4 is a longitudinal section taken on the line $xx$ in Fig. 3. Fig. 5 is a detail side view, and Fig. 6 is a sectional plan view, of the bearings at one end of the feed-rolls. Fig. 7 is a partial end view of the conveyer and elevator for the cobs. Fig. 8 is a partial cross-section through the husking-rolls. Fig. 9 is a side view of a husking-roll. Fig. 10 is a detail view of one of the devices for adjusting the springs which control the husking-rolls.

A is the frame of the machine.

A' is the driving-shaft of the cutter, journaled in bearings $a'$.

B is the main driving-belt, which passes over the pulley $b$ on the shaft A' and is driven from a driving-pulley $b'$ (indicated by dotted lines) on an engine-shaft or other convenient source of power.

C is the cutter, preferably provided with spirally-arranged blades.

C' is the plate the fodder rests on while being cut.

A feed-board $c$ is arranged at the top of the machine, and the cut corn is placed on this board and pushed rearward between the feed-rolls.

D is the upper feed-roll, and D' is the lower feed-roll. The shaft $d$ of the upper feed-roll is journaled in vertically-movable bearings $e$, and the shaft $d'$ of the lower feed-roll is journaled in stationary bearings $e'$. The two feed-rolls are serrated, grooved, or fluted, and intergear with each other when pressed into contact.

E are the brackets which support the feed-roll bearings. Each bracket has vertical grooves 2, and 3 are projections on the upper bearings $e$, which are pivoted in the grooves 2. The lower bearings have hollow bosses 4, which serve as oil-cups for the lower shaft and as supports for the bottoms of the upper bearings $e$ to rest on.

E' are blocks provided with convex bottoms 5, which rest on the bearings $e$, and 6 are projections which slide in the grooves 2. A yoke 5' is secured to the top of the bracket E and is provided with an adjusting-screw 6'. A spring 7 is provided and engages with a projection 8 on the block E', and 9 is a block engaging with the upper end of the spring and bearing against the lower end of the adjusting-screw. The rolls are set up by means of the screws and springs, and the manner of supporting the bearings $e$ permits one end of the upper roll to rise independent of its other end.

The lower roll D' is driven from one end of the shaft A' by means of a drive-chain 10, which passes over a chain-wheel 11 on the shaft A' and over a guide-wheel 12, carried by the frame. The lower part of the drive-chain bears on a chain-wheel 13, secured on the shaft $d'$. A small wheel 14 is also provided for adjusting the tension of the drive-chain and guiding it. The upper roll D is driven from the other end of the shaft A' by means of a drive-chain 15, which passes around a chain-wheel 16 on the shaft A' and around a chain-wheel 17 on the shaft $d$. A small wheel 18 is provided for regulating the tension of the drive-chain 15 and guiding it. A fly-wheel 19 is secured on the shaft A'.

The cobs are pinched off by the grooved feed-rolls and slide down the guide-board 52 to the husking devices. The stalks and leaves pass between the feed-rolls and are cut up by the cutter.

F is a shoe supported in the frame. The rear end of the shoe rests upon rollers $f$, which are journaled on pins $f'$, projecting from the frame. The front end of the shoe is supported by links G, which are pivoted to pins g outside the frame. The upper ends of the links G are pivoted to the shoe by pins 26, which pass through slots in the frame.

The cut-up fodder falls on a downwardly and forwardly inclined bottom H, provided with corrugations to make the fodder travel over its surface, and thence falls onto a downwardly and rearwardly inclined bottom H'. The bottoms H and H' are supported in the shoe F, and the bottom H' also has corrugations to make the fodder and corn travel over its surface when the shoe is shaken. The bottom H' extends under the husking devices and catches all the grains of corn and the huskings which drop from them. A perforated plate h is provided at the rear end of the bottom H' for separating the grains of corn from the fodder. The grains of corn drop through the plate h into the delivery-spout h', which is provided with a conveyer 20 for removing them. The conveyer 20 is preferably an auger-shaped conveyer of approved construction, driven by means of a pulley 21 on the end of its shaft.

I is a fan or blower, of any approved construction, journaled under the shoe F.

I' is the fan-shaft, and L' is the driving-pulley on one end of the fan-shaft.

The light leaves are blown out from the stalks by the blast of air from the fan as the fodder passes over the plate h, and the leaves are carried by the blast onto an elevator J at the rear end of the machine.

The elevator J is of any approved construction and is pivoted to the frame.

J' is the elevator-shaft, and j is the pulley for driving it. A shaft j' is provided, and 22 are cords wound on barrels on the shaft and adapted to raise or lower the elevator, according to the direction in which the shaft j' is revolved. The shaft j' is revolved and sustained by any approved means.

The cut stalks and leaves which are too heavy to be discharged by the blast drop off the end of the plate h between a toothed cylinder K and a toothed concave K' and are torn into shreds and discharged onto the elevator J. The cylinder is driven by a pulley k, secured on its shaft, and k' is a guard-plate over the top of the cylinder which is arranged at the lower rear part of the machine. The pulley k is driven by the main driving-belt B.

L L' are two pulleys secured, respectively, on the cylinder and fan shafts, and 23 is a belt passing over the said pulleys, so that the fan is driven from the cylinder-shaft.

M is a shaft extending crosswise of the machine under the feed-rolls and journaled in suitable bearings. A pulley m is secured on one end of the shaft M and is driven by the main driving-belt B. M' is a pulley secured on the opposite end of the shaft M, and m' is a belt which passes over the pulley M' and over a pulley 24, which is secured on a shaft 25. The shaft 25 is journaled in suitable bearings and extends crosswise of the machine under the shoe F.

N are eccentrics secured on the shaft 25, and N' are eccentric-rods provided with eccentric-straps which are driven by the eccentrics N. The eccentric-rods are pivoted to the pins 26, so that the shoe is reciprocated longitudinally by the eccentrics.

The shaft 25 has a pulley 27 secured on it, and 28 is a belt passing over the pulley 27 and over the pulley 21, so that the conveyer 20 is driven from the shaft 25. The shaft 25 also has a pulley 29 secured on it, and 30 is a belt which passes over the pulley 29 and over the pulley j, so that the elevator J is driven from the shaft 25.

O is a shaft arranged longitudinally at the middle part of the machine for driving the husking-rolls. The shaft O is driven from the shaft M by means of beveled toothed wheels o.

P are the husking-rolls arranged side by side in an inclined position. Each husking-roll is formed in sections, and p are serrated disks secured between the sections by pins p'. The rolls P are provided with grooves for the disks of the next adjacent rolls to work in. The sections of the rolls are clamped against shoulders or collars upon the roll-shafts q by means of nuts q'. The middle roll P' is formed similar to the rolls P, but is secured on the shaft O, which is journaled in stationary bearings o'.

The roll-shafts q are journaled in laterally-slidable bearings 31. Guide-bars 32 are secured in pairs crosswise of the frame at a little distance apart for the bearings 31 to slide on, and 33 are bars for retaining the bearings on the pairs of bars 32. The bearings 31 have projections 34, which slide between each pair of bars 32 and prevent the bearings from moving longitudinally.

The rolls P are pressed toward the middle roll P' by means of springs 35 and 36. The springs 35 bear against the end bearings 31 at the rear part of the machine, and 37 are screws which engage with blocks 38, secured to the frame and which adjust the pressure of the springs 35. The springs 36 bear against blocks 39, mounted on the end shafts q at the other ends of the rolls from the springs 35, and 40 are screws carried by the frame and which set up the springs 36.

The shaft O has a toothed wheel 41 secured on the other end portion of it from the beveled wheels o, and 42 are similar toothed wheels secured on the shafts q and gearing into each other and into the wheel 41, so that the motion of the shaft O is transmitted to all the shafts q, each alternate shaft being driven in one direction and the remaining shafts in the reverse direction.

R is a conveyer arranged over the husking-rolls and provided with projections r. The conveyer R consists of an endless web, the discharge end of which is carried and driven by a roller 43, secured on a shaft 44, which is journaled in stationary bearings. The shaft 44 has a pulley 45 secured on one end of it, and 46 is a belt which passes over the pulley 45 and over a pulley 47 on the shaft 25, which drives the eccentrics, so that the conveyer R is driven from the shaft 25. The roller 48 at the other end of the conveyer is mounted on a shaft 49, which is carried by the free ends of arms 50. The arms 50 pass through slots in the frame and are free to oscillate in a vertical plane. The ends of the arms 50 are screw-threaded and provided with nuts 51, so that the conveyer-web can be stretched. The guide-board 52 delivers the cobs onto the husking-rolls and under the conveyer R. The conveyer drags the cobs longitudinally over the husking-rolls, and the serrated disks remove the husks. A plate S is arranged over the shafts $q$, between the discharge ends of the husking-rolls and the wheels 42, for receiving the husked cobs.

S' is a conveyer provided with projections $s$ and arranged crosswise of the machine over the plate S. The conveyer S' consists of an endless web carried by rollers, and 53 is a pulley secured on the shaft 54 of the driving-roller $s'$. The pulley 53 is driven from the shaft O by means of a belt 54, which passes over it and over a pulley 55, secured on the shaft O.

T is an elevator of approved construction arranged at the delivery end of the conveyer S'. The elevator T is driven by a roller 56, secured on a shaft 57, which is journaled in bearings 58, secured to the side of the frame. The shaft 57 has a toothed wheel 59 secured on it and gearing into a toothed wheel 60, secured on the shaft 54, so that the elevator is driven from the conveyer. The elevator discharges the cobs into a cart or other convenient receptacle.

The arrows in the drawings indicate the direction of motion of the various parts of the machine.

What I claim is—

1. A corn-husker and feed-cutter, comprising separate mechanisms for pinching off the ears, cutting up the leaves and stalks, and husking the ears, a reciprocatory shoe provided with a downwardly and forwardly inclined bottom H for catching the cut leaves and stalks, and a downwardly and rearwardly inclined bottom H' below the bottom H for catching the huskings, said bottom H' having perforations at its rear part, a toothed cylinder and concave for receiving the heavy material from the bottom H', a guard over the said cylinder, and a fan for blowing the light material over the said guard, substantially as set forth.

2. A corn-husker and feed-cutter, comprising separate mechanisms for cutting up the leaves and stalks, and husking the ears, separate bottoms for catching the cut fodder and the huskings, a toothed cylinder and concave for receiving the heavy portions of the fodder and huskings collected by the said bottoms, a guard over the said cylinder, and a fan for blowing the light portions of the fodder and huskings over the said guard, substantially as set forth.

3. The combination, with a series of husking-rolls; of a driving-roller journaled in stationary bearings and arranged over the delivery ends of the said rolls, arms 50 pivoted at one end and provided with means for adjusting their length, a vertically-movable roller journaled in the free ends of the said arms and arranged over the receiving ends of the said rolls, and a conveyer-web carried by the said rollers and moving the ears from the receiving ends to the delivery ends of the said rolls, said arms 50 affording a single means both for tightening the said web and permitting its receiving end to rise and receive the ears, substantially as set forth.

In testimony whereof I affix my signature in presence of two witnesses.

PETER RUPP.

Witnesses:
YARNALL RAKESTRAW,
JOHN WECKERLY.